Figure 1:
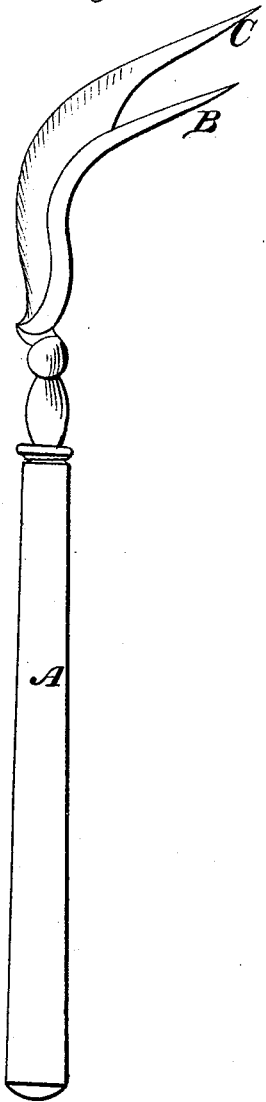
Figure 2:
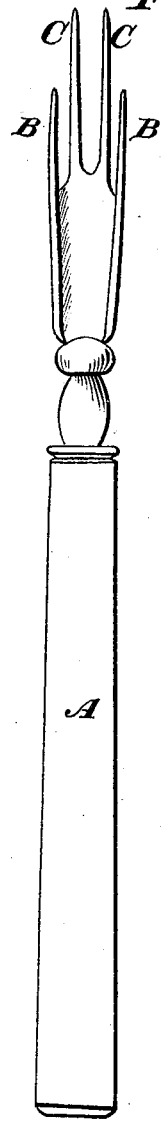

*J. Patterson.*

*Table Fork.*

Nº 99,341.   Patented Feb. 1, 1870.

WITNESSES:
Fred A Elliott
L. D. Marson

INVENTOR:
James Patterson

United States Patent Office.

JAMES PATTERSON, OF SAN FRANCISCO, CALIFORNIA.

Letters Patent No. 99,341, dated February 1, 1870; antedated January 29, 1870.

IMPROVEMENT IN TABLE-FORKS.

The Schedule referred to in these Letters Patent and making part of the same.

*To all whom it may concern:*

Be it known that I, JAMES PATTERSON, of the city and county of San Francisco, have invented a new and improved Table-Fork; and I do hereby delare that the following is a full and exact description thereof, reference being had to the accompanying drawings, and to the letters of reference thereon.

The nature of my invention consists in providing a table-fork that will obviate the necessity of projecting the elbow, while using a fork at the table, to the annoyance of one's neighbor; and, also, to securely hold a potato on the fork, precluding the liability of the potato splitting while being peeled.

To enable others skilled in the art to make and use my invention, I will proceed to describe its construction and operation.

First, I construct my fork with four prongs, so arranged, at an angle of about forty-five degrees, more or less, from the handle, marked A, as seen in drawings, that when used at the table, the parties so using it may do so without the necessity of removing the elbow from their side.

Second, the two front prongs, marked C, being a little longer than the two prongs marked B, are for the purpose of picking up the food to be carried to the mouth, and there received at the lips of the eater, without being compelled to open the mouth so wide as to receive all the four prongs.

Third, the four prongs are so designed, that a potato may be taken on the prongs of the fork, and held until peeled, without the danger of splitting the potato, as is the case too frequently with the forks now commonly in use.

Fourth, the two prongs marked B, being in the rear of the front prongs, marked C, will readily accommodate themselves to the work, when the fork is inserted, in holding the meat to be cut or potato to be peeled.

What I claim as my invention, and desire to secure by Letters Patent, is—

A fork, with the prongs C C and B B, constructed and arranged to operate as and for the purpose set forth.

JAMES PATTERSON.

Witnesses:
THOMAS S. MILLER,
L. D. MARSON.